H. Y. LAZEAR.
Gas Heater.
No. 79,989.   Patented June 14, 1868.
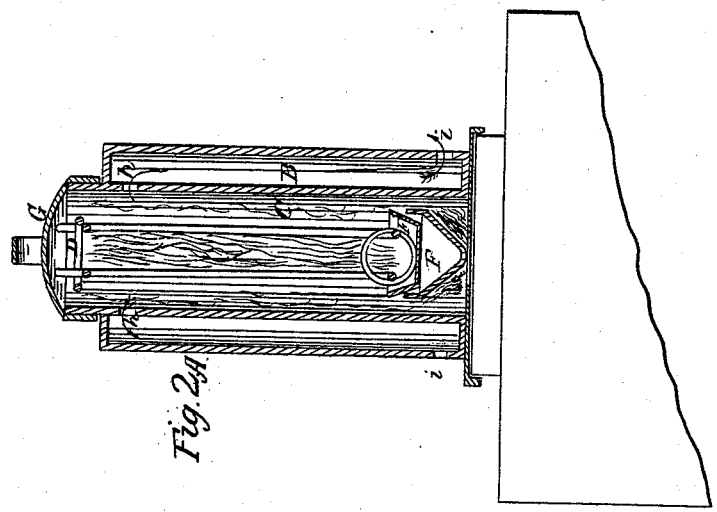
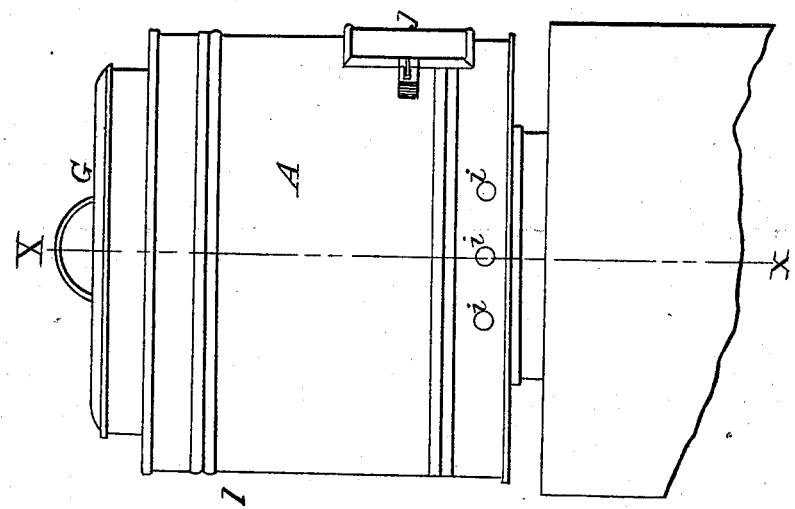
Witnesses:
Inventor:

United States Patent Office.

H. Y. LAZEAR, OF NEW YORK, N. Y.

Letters Patent No. 79,989, dated July 14, 1868.

IMPROVEMENT IN GAS-HEATERS.

*The Schedule referred to in these Letters Patent and making part of the same.*

TO ALL WHOM IT MAY CONCERN:

Be it known that I, H. Y. LAZEAR, of the city, county, and State of New York, have invented a new and improved Apparatus for Broiling Steak by Gas; and I do hereby declare that the following is a full, clear, and exact description thereof, which will enable those skilled in the art to make and use the same, reference being had to the accompanying drawings forming part of this specification.

This invention relates to a new and improved apparatus for broiling meats or steaks by gas or over a gas-stove; and it consists in arranging a closed casing or double-walled upright cylinder over a gas-stove, in such a manner that the wire steak-broiler with the steak is inserted therein, and the steak broiled simultaneously on both sides; and also in the arrangement for protecting the grease or juices which exude from the steak from burning, and in the general formation and operation of the apparatus, as will be hereinafter described.

Figure 1 represents the casing or cylinder as when in use, standing upon a gas-stove, the latter being seen in red color.

Figure 2 is a vertical section of the same through the line $x\ x$.

Similar letters of reference indicate corresponding parts.

A is the cylinder, which is made of tin or other suitable metal, composed of two oval casings, which, when placed together, leave an annular space between them, as seen in the drawing.

B represents the annular space.

C is the fire-chamber or interior of the cylinder in which the broiling is done.

D is the wire steak-broiler in which the steak is supported.

E is a V-shaped trough, against which the flame impinges, and is spread or divided, and rises on each side, as seen in the drawing.

F represents the dripping-pan in which the bottom of the broiler rests, and which receives the fat or juices from the meat.

The dripping-pan F rests on plaster of Paris or other good non-conductor of heat E', with which the V-shaped trough E is filled, or nearly filled, as seen, for the purpose of preventing the heat of the flame from burning the grease in the dripping-pan, and thereby preventing smoke in the operation of broiling.

G is the cover, which is taken off for inserting the steak, and is then put on, and the broiling-chamber closed at the top while the steak is being broiled.

$h$ represents orifices through the sides of the inner casing, which allow of the discharge of the heated air or gases from the broiling-chamber C into the annular space B, which gases descend, and are discharged into the atmosphere through the orifices $i$ near the bottom of the outer casing.

J is a door in the end of the casing, for admitting the dripping-pan.

By this arrangement the steak is broiled or cooked upon each side simultaneously.

The fat and juices are caught in the pan F, and protected from burning by the filling E'.

The apparatus is very simple and durable, and the operation is perfect.

I claim as new, and desire to secure by Letters Patent—

1. The V-shaped trough E and the filling E', by which the flame is divided, and the grease protected from burning, and smoke thereby prevented, substantially as described, in combination with a gas steak-broiler.

2. The annular space B and the orifices $h$ and $i$, substantially as and for the purposes set forth.

3. An apparatus for broiling steak by gas, whereby the steak is broiled or cooked simultaneously on both sides, or where the sides are equally exposed to the flame and heat, substantially as shown and described.

The above specification of my invention signed by me, this 10th day of June, 1868.

H. Y. LAZEAR.

Witnesses:
  FRANK BLOCKLEY,
  ALEX. F. ROBERTS.